United States Patent [19]

Han

[11] Patent Number: 4,958,062

[45] Date of Patent: Sep. 18, 1990

[54] DRIVING CONTROL APPARATUS FOR AN ELECTRIC RANGE WITH SELF-DIAGNOSIS FUNCTION

[75] Inventor: Sang Soo Han, Kyunggi-Do, Rep. of Korea

[73] Assignee: Goldstar Instrument & Electric Co., Ltd., Seoul, Rep. of Korea

[21] Appl. No.: 317,189

[22] Filed: Feb. 28, 1989

[51] Int. Cl.$^5$ .............................................. H05B 1/02
[52] U.S. Cl. .................................... 219/497; 219/501; 219/508; 219/506; 219/413; 307/117
[58] Field of Search ............. 219/491, 413, 494, 497, 219/499, 501, 505, 506, 508, 210, 216 PH; 323/235, 236, 319; 307/117

[56] References Cited

U.S. PATENT DOCUMENTS

| | | | |
|---|---|---|---|
| 3,921,162 | 11/1975 | Fukai et al. | 219/276 PH |
| 3,937,921 | 2/1976 | Furuichi et al. | 210/501 |
| 4,206,552 | 6/1980 | Pomerantz et al. | 210/497 |
| 4,314,143 | 2/1982 | Bilstad et al. | 219/506 |
| 4,593,180 | 6/1986 | Narita et al. | 219/501 |
| 4,628,186 | 9/1986 | Bergemann et al. | 219/497 |

Primary Examiner—M. H. Paschall
Attorney, Agent, or Firm—Kenyon & Kenyon

[57] ABSTRACT

A driving control apparatus for an electric range having a function of self-diagnosis by detecting a temperature within an oven with a voltage, detecting the present temperature within an oven by comparing the detected temperature with reference voltages according to each step, controlling precisely the temperature within the oven by the present temperature with an established temperature and determining automatically the state of a hardware for outputting the reference voltages at the time of detecting the present temperature. The apparatus can precisely control the temperature within the oven, and in case of an abnormal condition of a hardware, it stops the operation of heater and indicates the error, thereby the reliability and safety of the product can be enhanced.

11 Claims, 6 Drawing Sheets

| step | P8 | P7 | P6 | P5 | P4 | P3 | P2 | P1 | V4 | TEMP (°F) |
|---|---|---|---|---|---|---|---|---|---|---|
| 0 | 0 | 0 | 0 | 0 | 0 | 0 | 0 | 0 | 0 | -35 |
| 1 | 0 | 0 | 0 | 0 | 0 | 0 | 0 | 1 | $1/256 \times B^+$ | -30 |
| 2 | 0 | 0 | 0 | 0 | 0 | 0 | 1 | 0 | $2/256 \times B^+$ | -25 |
| 3 | 0 | 0 | 0 | 0 | 0 | 0 | 1 | 1 | $3/256 \times B^+$ | -20 |
| 4 | 0 | 0 | 0 | 0 | 0 | 1 | 0 | 0 | $4/256 \times B^+$ | -15 |
| 5 | 0 | 0 | 0 | 0 | 0 | 1 | 0 | 1 | $5/256 \times B^+$ | -10 |
| 6 | 0 | 0 | 0 | 0 | 0 | 1 | 1 | 0 | $6/256 \times B^+$ | -5 |
| 7 | 0 | 0 | 0 | 0 | 0 | 1 | 1 | 1 | $7/256 \times B^+$ | 0 |
| 8 | 0 | 0 | 0 | 0 | 1 | 0 | 0 | 0 | $8/256 \times B^+$ | 5 |
| 9 | 0 | 0 | 0 | 0 | 1 | 0 | 0 | 1 | $9/256 \times B^+$ | 10 |
| 255 | 1 | 1 | 1 | 1 | 1 | 1 | 1 | 1 | $255/256 \times B^+$ | 1240 |

DRIVING CONTROL APPARATUS FOR AN ELECTRIC RANGE WITH SELF-DIAGNOSIS FUNCTION

BACKGROUND OF THE INVENTION

The present invention relates to a driving control apparatus for an electric range having a function of self-diagnosis. More particularly, it relates to a control apparatus for an electric range which can control the operation of the electric range within a preestablished temperature range by correctly measuring a temperature of the interior of an oven, and to enhance the reliability and safety of an electric range by automatically detecting and diagnosing a failure fault of a hardware.

In a conventional driving control device for an electric range, there is provided a mechanical operator for selecting each function, a temperature controller which turns ON/OFF in accordance with the temperature within an oven and a heater drive and control unit for controlling the drive of a heater in accordance with the ON/OFF state of the temperature controller. And the temperature within the oven is indicated on the temperature controller by a scale and a numeral. Accordingly, when a user sets the temperature at a predetermined range by rotating a knob of the temperature controller, the heater drive and control unit is operated to increase the temperature within the oven, and at this moment the temperature reaches to the established temperature, a switch of the temperature controller turns off and the heater drive and control unit stops its operation so that the temperature within the oven. Thereafter, when the temperature within the oven is lower than the established temperature, the switch of the temperature controller turns on and the temperature within the oven rises again to the established temperature.

However, in such a conventional electric range, it is not only difficult to obtain an accurate control of the temperature at the established range since the temperature control device has a mechanical construction, but the failure fault occurs frequently since the useful life of such a temperature control device is too short. In addition, it lacks safety because no device is provided for preventing the operation of the heater drive and control unit in the case of the occurrence of a failure fault.

SUMMARY OF THE INVENTION

Therefore, an object of the present invention is to provide a driving control apparatus for an electric range which does not have the above problems and disadvantages encountered in the prior art device.

Another object of the present invention is to provide a driving control apparatus for an electric range in which it is possible to detect the temperature within an oven and represent it with a voltage; to detect the present temperature within an oven by comparing the detected temperature with reference voltages according to each step; to control precisely the temperature within the oven by comparing the present temperature with an established temperature; and to determine automatically the state of a hardware for outputting the reference voltages when the present temperature is detected.

In accordance with the present invention, the driving control apparatus for an electric range comprises a constant voltage circuit for supplying a constant voltage to each component of the apparatus; a sensor power supply for supplying and amplifying the constant voltage as a sensor power; a temperature detector for detecting the temperature within an oven with a voltage by receiving the output voltage of the sensor power supply; an overtemperature detector for detecting an overtemperature condition by comparing the output voltage of the temperature detector with an overtemperature reference voltage; a comparing and amplifying circuit for comparing and amplifying the output voltage of the temperature detector with a reference voltage; digital/analog converter for converting step pulse signals into analog signals; a comparator for comparing the output voltage of the comparing and amplifying circuit with the output voltage of the digital/analog converter; a function selection key section for outputting each function selection signal; a controller for receiving the function selection signal from the function selection key section and the output signal from the comparator as input signals and for outputting a function selection indicating signal, a power control signal and a step pulse signal; a heater driving section which is controlled by the power control signal of the controller., and an indicator for indicating the function selection indicating signal of the controller.

BRIEF DESCRIPTION OF THE DRAWINGS

The above and other objects, features and advantages of the present invention will become more apparent from the following detailed description taken in conjunction with the accompanying drawings, in which.

DETAILED DESCRIPTION OF THE PRESENT INVENTION

Figure 1:
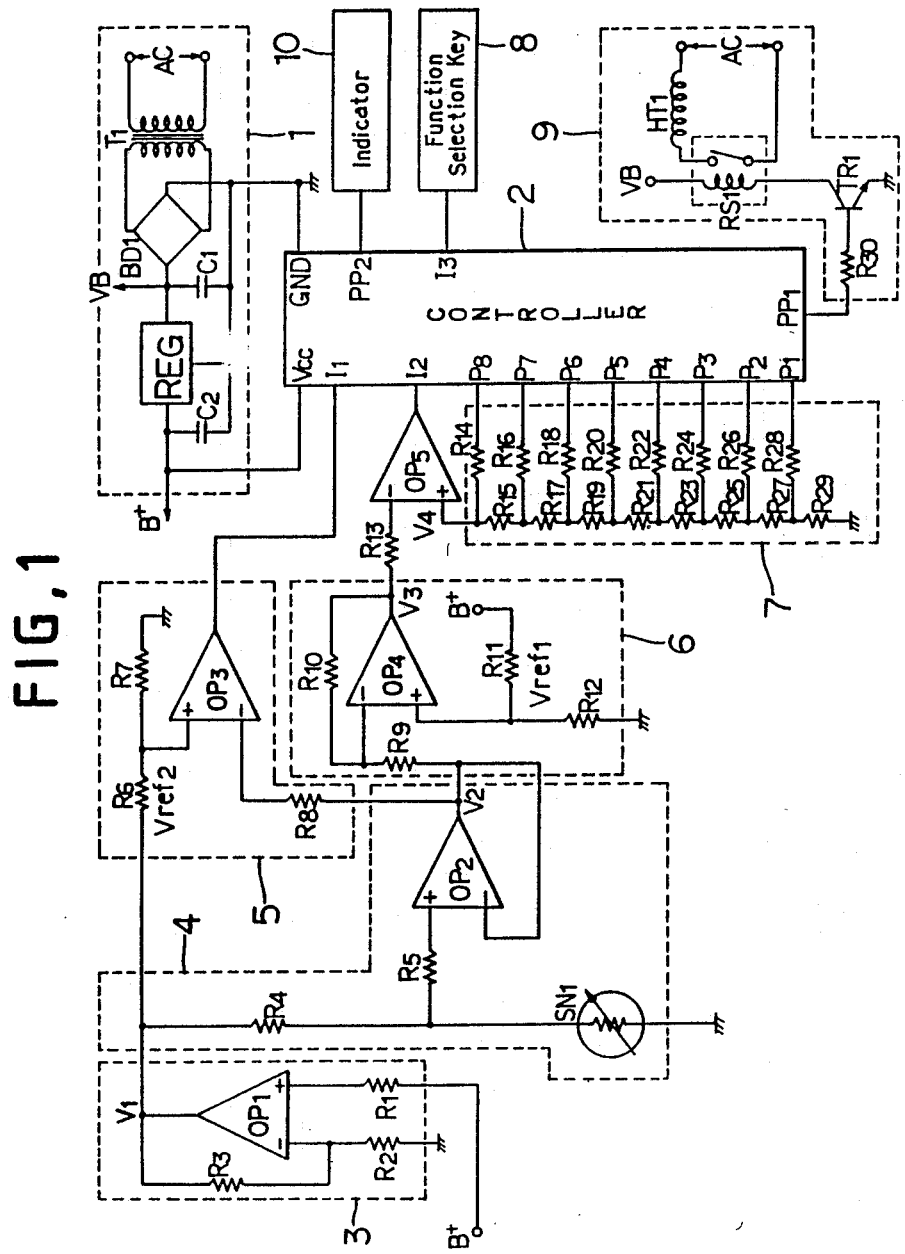
FIG. 1 is a circuit diagram according to an embodiment of the present invention.

Referring to FIG. 1, the control circuit according to the present invention is constituted in a manner that an output side of a constant voltage circuit 1 which generates a constant voltage (B+) and consists of a transformer $T_1$, a diode bridge $BD_1$, capacitor $C_1$ and $C_2$, and a voltage regulator REG is connected to a power terminal Vcc of a controller 2 and an input side of a sensor power supply 3 consisting of resistors $R_1$-$R_3$ and an operational amplifier $OP_1$, the output side of the sensor power supply 3 is connected to an input side of a temperature detector 4 consisting of resistors $R_4$ and $R_5$, a temperature sensor $SN_1$, and an operational amplifier $OP_2$, the outputs of the temperature detector 4 and sensor power supply 3 are connected to an overtemperature detection input terminal $I_1$ of the controller 2 through an overtemperature detector 5 consisting of resistors $R_6$-$R_8$ and an operational amplifier $OP_3$ which compares and detects an overtemperature condition. The output side of said temperature detector 4 is also connected to negative input terminal (−) of an operational amplifier $OP_5$ through a comparing and amplifying circuit 6 consisting of resistors $R_9$–$R_{12}$ and a comparator $OP_4$ and again through a resistor $R_{13}$. step pulse terminals $P_1$–$P_8$ of the controller 2 are connected to a noninversion (positive) input terminal (+) of comparator $OP_5$ through a digital/analog converter 7 consisting of resistors $R_{14}$–$R_{29}$. The output terminal of the comparator $OP_5$ is connected to a present temperature detection input terminal $I_2$ of said controller 2. An output side of a function selection key section 8 is connected to a function input terminal $I_3$ of the controller 2. A power control output terminal $PP_1$ of the controller 2 is connected to an input side of a heater driving circuit 9 consisting of a resistor $R_3$, a transistor $TR_1$, a relay switch $RS_1$ and a heater $HT_1$. A function indicating output terminal $PP_2$ is connected to an indicator 10. In the above, the temperature sensor $SN_1$ is a static characteristic element.

The operation and effect of the present invention constructed as above will now be described in detail with reference to the accompanying flow charts.

When an alternating current AC is supplied, it is rectified by a diode bridge $BD_1$ through a transformer $T_1$ and smoothed by a capacitor $C_1$ and then supplied to a relay switch $RS_1$ of a heater driving circuit 9. The output voltage from the diode bridge $BD_1$ is output through a voltage regulator REG at a constant voltage (B+) and applied to a power terminal Vcc of the controller 2 as a drive voltage. And, the constant voltage (B+) is amplified by a sensor power supply 3 and applied to the input of a temperature detector 4 and the input of an overtemperature detector 5.

That is to say, the output voltage $V_1$ of the sensor power supply 3 is amplified with $$V_1 = \left(1 + \frac{R_3}{R_2}\right) \cdot B+$$

is then divided by the resistances of a resistor $R_4$ of the temperature detector 4 and a temperature sensor $SN_1$ The divided voltage $$\left(= \frac{SN_1}{R_4 + SN_1} \cdot V_1\right)$$

is thereafter amplified and output by an operational amplifier $OP_2$ which is operated by a voltage follower. The output voltage $V_2$ of the temperature detector 4 is compared and amplified with a reference voltage $V_{ref1}$ that is established by resistors $R_{11}$ and $R_{12}$ at a comparing and amplifying circuit 6 and then becomes output voltage $V_3$ where 6

$$V_3 = \frac{R_{10}}{R_9}(V_{ref1} - V_2) + V_{ref1}$$

$V_3$ is applied to an inversion (negative input terminal of a comparator $OP_5$.

On the other hand, the output voltage $V_2$ of the temperature detector 4 is compared with an overtemperature reference voltage $V_{ref2}$ established by resistors $R_6$ and $R_7$ at the overtemperature detector 5 and applied to an overtemperature detection input terminal $I_1$ of the controller 2. That is to say, in case that the output voltage $V_2$ of the temperature detector 4 is lower than the overtemperature reference voltage $V_{ref2}$, a high potential signal is output from a comparator $OP_3$ and applied to the overtemperature detection input terminal $I_1$ of the controller 2. On the contrary, in case that the output voltage $V_2$ of the temperature detector 4 is higher than the overtemperature reference voltage $V_{ref2}$, a low potential signal is output from the comparator $OP_3$ and applied to the overtemperature detection input terminal $I_1$ of the controller 2.

Figure 3A:
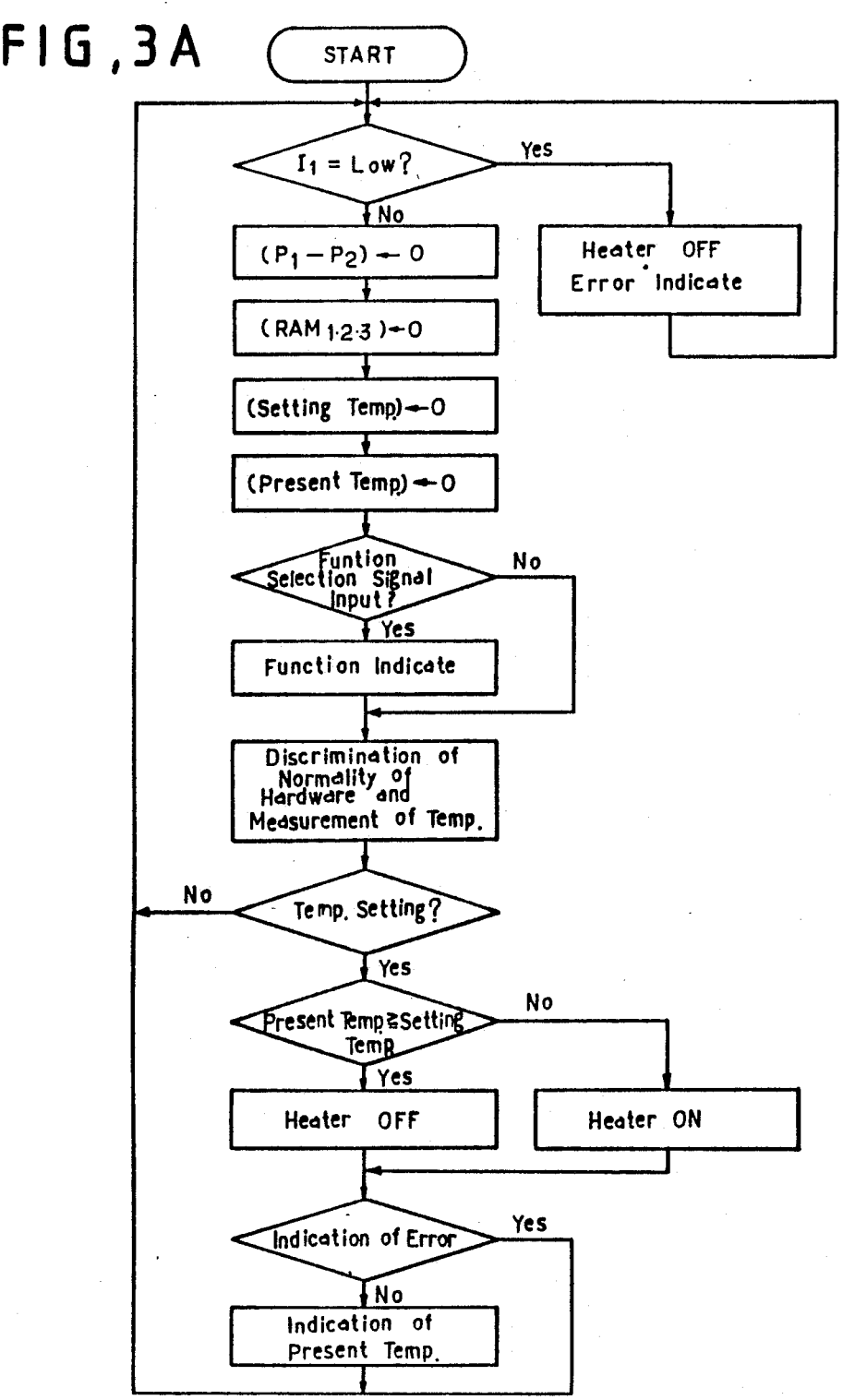
FIG. 3A is a main flow chart of the controller of FIG. 1.

Under such a state that a low potential signal as the overtemperature detection signal is input to the overtemperature detection input terminal $I_1$ of the controller 2, a low potential signal is output from a power control output terminal $PP_1$ to stop the operation of the heater driving circuit 9, and an error indication signal is indicated on an indicator 10 through a function indicating output terminal $PP_2$, as shown in FIG. 3A.

On the other hand, under the state that a high potential signal as the overtemperature detection signal is input to the overtemperature detection input terminal $I_1$ of the controller 2, the step pulse terminals $P_1$–$P_8$ are made to low potential and the value of the memories $RAM_{1-3}$ (not shown) within the controller 2 are made to "0". $RAM_1$ is a memory that stores increased step values, $RAM_2$ is a memory that stores decreased step values, and the $RAM_3$ is a memory for discriminating the completion of measurement of the present temperature.

Figure 3B:
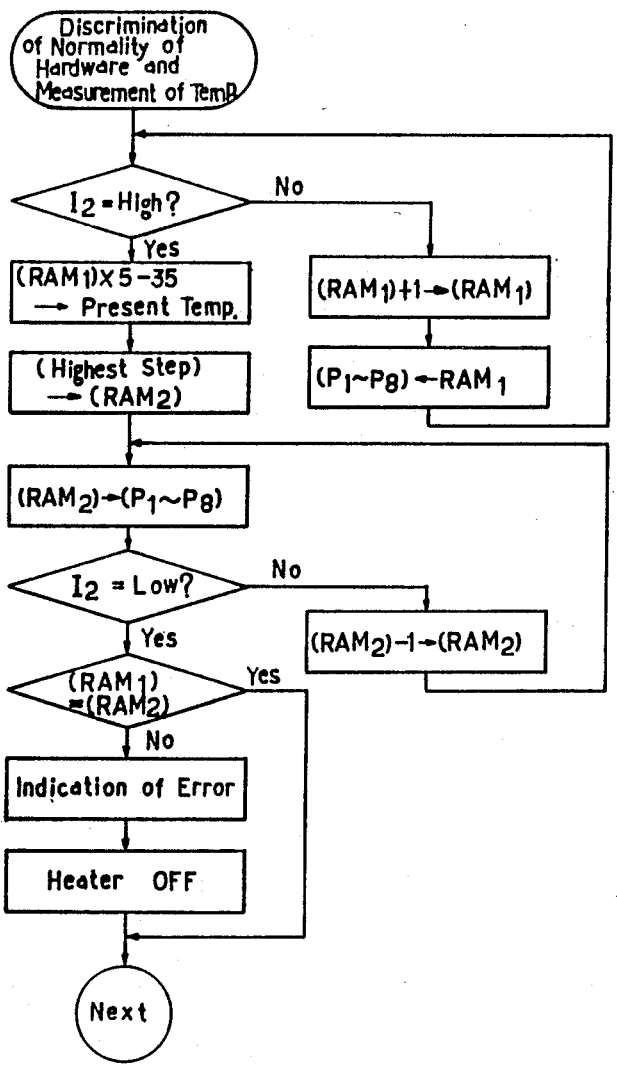
FIGS. 3B and 3C are flow charts for the discrimination of normality and measurement of temperature of a hardware.
Figure 3C:
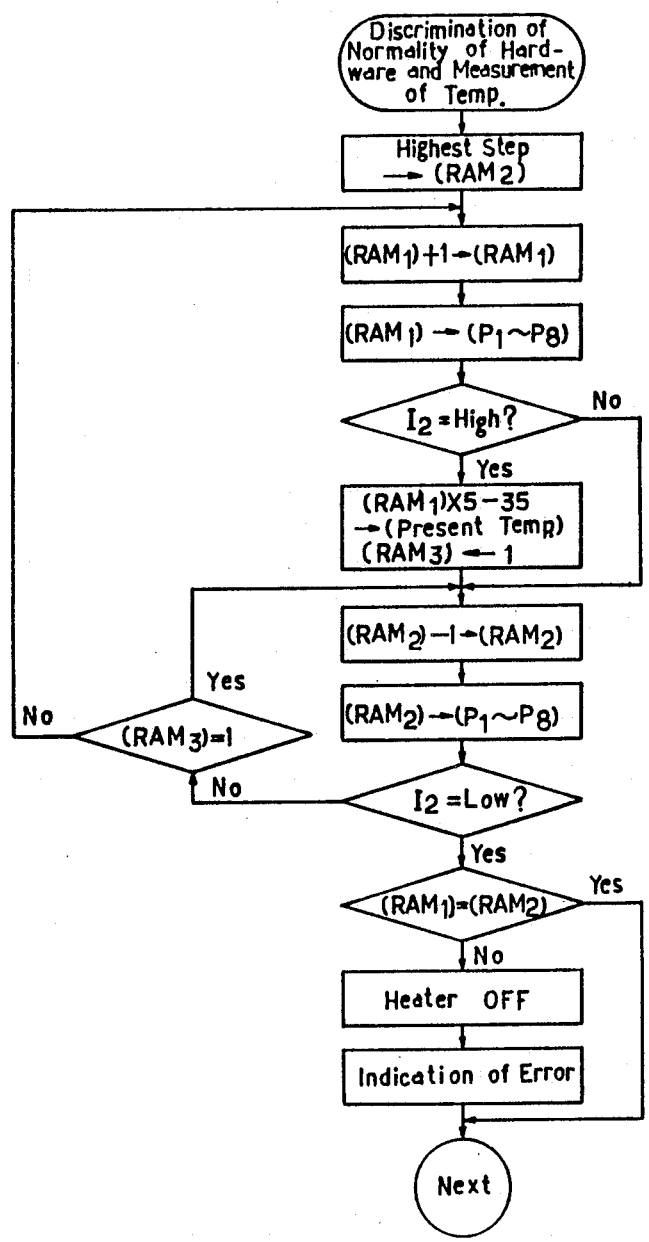

Furthermore, at this moment, when the temperature is established at "0" and the present temperature is established at "0", thereafter a function selection signal is input from a function selection key section 8 to the controller 2 and the selection of function is indicated on the indicator 10. Thereafter, the routine for the discrimination of the normality of hardware and the temperature measument are executed as shown in FIG. 3B or FIG. 3C.

Figures 2A, 2B:
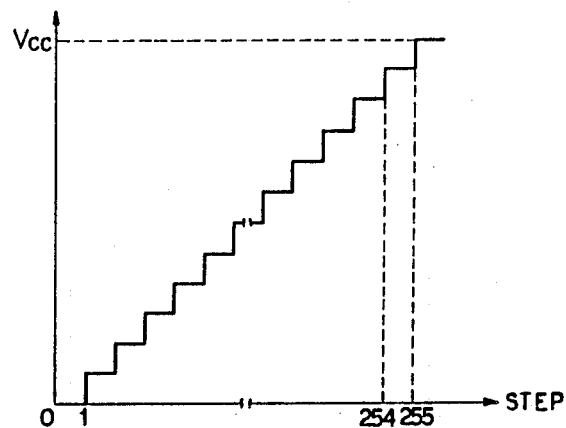
FIG. 2A is a waveform view of voltage in accordance with the step variation of the controller of FIG. 1.
FIG. 2B is a table showing the states of each terminal in accordance with the step variation of the controller of FIG. 1.

That is to say, the controller 2 outputs successively the step signals from the step 0 to the step 255 through its step pulse terminals $P_1$–$P_8$, as shown in FIG. 2B. For an example, at the first step, i.e., step 0, all the step pulse terminals $P_1$–$P_8$ generate low potential signals, at the second step, i.e., step 1 only one step pulse terminal $P_1$ generates high potential signal and the remaining step pulse terminals $P_2$–$P_8$ generate low potential signals. At the next step, i.e., step 2, the step pulse terminal $P_2$ generates a high potential signal and the remaining step pulse terminals $P_1$, $P_3$–$P_8$ generate low potential signals. By the same manner all the step pulse terminals $P_1$–$P_8$ generate high potential signals at the last step, i.e., step 255.

The step pulse signals output from the step pulse terminals $P_1$–$P_8$ of the controller 2 are converted into analog signals by a digital/analog converter 7 and input to a noninversion input terminal (+) of a comparator $OP_5$ as a reference voltage $V_4$. This reference voltage $V_4$ can be found by the following equation;

$$V_4 = \left(\frac{P_8}{2^1} + \frac{P_7}{2^2} + \ldots + \frac{P_2}{2^7} + \frac{P_1}{2^8}\right)B+$$

That is to say, as shown in FIG. 2B at the step 1, the reference voltage $V_4$ becomes $$\frac{1}{256}B+,$$

at the step 2, the reference voltage $V_4$ becomes $$\frac{2}{256}B^+,$$

and similarly at the step 255, the reference voltage $V_4$ becomes $$\frac{255}{256}B^+.$$

Such reference voltages $V_4$ according to the variation of step are shown in FIG. 2A in the waveforms.

And, the observed temperatures according to each step are obtained by multiplying the number of the step by 5 and subtracting 35 therefrom.

That is to say, as shown in FIG. 2B the step 0 is made to be observed as $-35°$ F., and thereafter whenever the step is increased by one step, the temperature is made to be observed with a 5° F. increased.

Therefore, under a state that a voltage $V_3$ which is applied to an inversion input terminal $(-)$ of the comparator $OP_5$ from the comparing and amplifying circuit 6 is established a little lower than the reference voltage $V_4$ which is applied to a noninversion input terminal $(+)$ of the comparator $OP_5$, when the temperature within the oven becomes the observed temperature according to each step as described above, a high potential signal is output from the comparator $OP_5$.

For an example, in case that the temperature within the oven is 0° F. which is an observed temperature of step 7, the reference voltage $V_4$;

$$\left(\frac{7}{256}B^+\right)$$

which is applied to a noninversion input terminal $(+)$ of the comparator $OP_5$ becomes higher than the output voltage $V_3$ of the comparing and amplifying circuit 6, which is applied to the inversion input terminal $(-)$ of the comparator $OP_5$, thereby a high potential signal outputs from the comparator $OP_5$. Similarly, in case that the temperature within the oven is 5° F. which is an observed temperature of step 8, a high potential signal is applied to a present temperature detection input terminal $I_2$ of the controller 2 from the comparator $OP_5$ when the signal of the step 8 is output from the controller 2. Thus, when a high potential signal is applied to the present temperature detection input terminal $I_2$ of the controller 2, the present temperature within the oven is observed and memorized by the number of the step which is output from the step pulse terminals $P_1-P_8$ at that moment.

At this time, if one of the resistors $R_{14}-R_{29}$ of the digital/analog converter 7 is open, the precise reference voltage $V_4$ by the step signals of the step pulse terminals $P_1-P_8$ can not be applied to the noninversion input terminal of the comparator $OP_5$. For an example, if the resistor $R_{24}$ of the digital/analog converter 7 is open, even at the step 8 which is destined to output a high potential signal from the step pulse terminal $P_3$ of the controller 2, the reference voltage $V_4$ which is applied to the noninversion input terminal $(+)$ of the comparator $OP_5$ becomes zero(0) potential as same as the step 0, thereby it becomes to detect erroneously the present temperature.

Accordingly, after observing and memorizing the present temperature within the oven as above, it is discriminated whether the hardware, i.e., the digital/analog converter 7 is normal or abnormal, as shown in FIG. 3B.

Figure 4A:
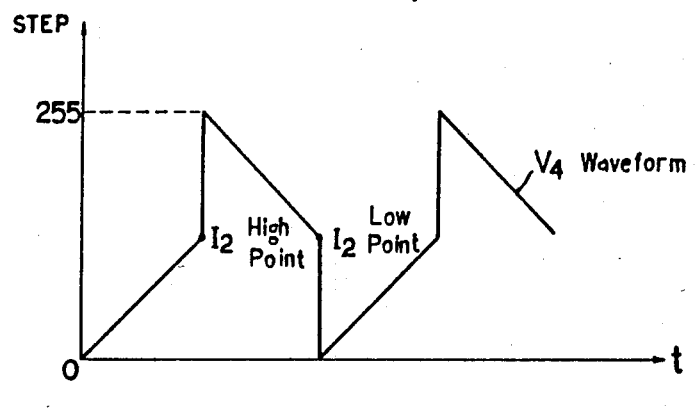
FIGS. 4A and 4B are explanatory views corresponding to FIGS. 3B and 3C.

That is to say, after the controller 2 observes and memorizes the present temperature, it outputs step pulse signals through the step pulse terminals $P_1-P_8$ by decreasing by one step from the highest step 255, and seeks the number of step at the time when a low potential signal is output from the comparator $OP_5$. At this moment, if the number of step is identical to that of the step at the time when said present temperature is observed, it is discriminated that the, digital/analog converter 7 is in a normal condition. If not, it is discriminated that the digital/analog converter 7 is in an abnormal condition. The above procedure is shown in FIG. 4A in the waveform.

On the other hand, dissimilarly to the above procedure it is also possible to execute the discrimination of the normality of hardware and the measurement of the present temperature by steps shown in the flow chart of FIG. 3C.

That is to say, it can be attained by increasing and decreasing the step signals which are output from the step pulse terminals $P_1-P_8$ of the controller 2 by one step from the step 0 and the step 255 in turn, not by successively increasing the step signal from the lowest step 0 or by successively decreasing the step signal from the highest step 255.

That is, the step pulse signals which are output from the step pulse terminals $P_1-P_8$ of the controller 2 are output by the order of step 0→step 255→step 1→step 254→step 2 ---.

Figure 4B:
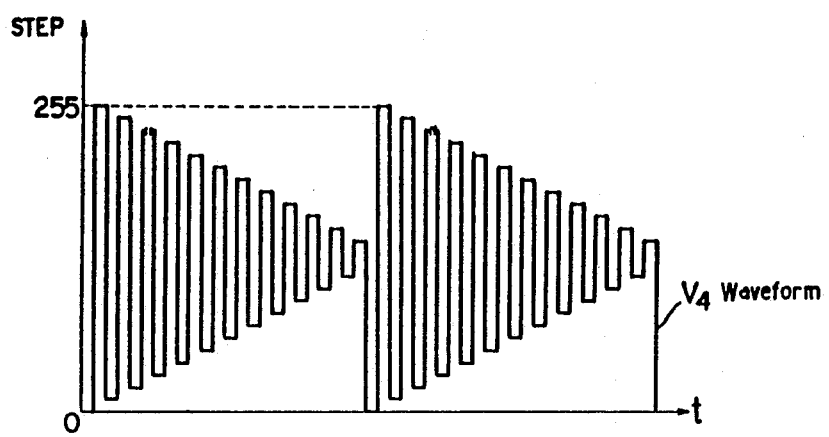

If a high potential signal is applied to a present temperature detection input terminal $I_2$ of the controller 2 at the time of increasing the step, the present temperature within the oven is observed and memorized by the number of step at that moment. If a low potential signal is applied to the present temperature detection input terminal $I_2$ of the controller 2 at the time of decreasing the step, the number of step at that moment is compared with the number of step at the time when the present temperature is observed, and at this time, if they are identical, it is discriminated that the digital/analog converter 7 is in a normal condition, if not, it is discriminated that the digital/analog converter 7 is in an abnormal condition. The above procedure is shown in FIG. 4B in the waveform.

While, if it is discriminated that the digital/analog converter 7 is in an abnormal condition, the controller 2 outputs a low potential signal through its power control output terminal $PP_1$ so that the operation of the heater driving circuit 9 is stopped and the controller further outputs an error signal through its function indicating output terminal $PP_2$ so that the indicator 10 idicates "error".

If it is discriminated that the digital/analog converter 7 is in a normal condition by the controller 2, the above described procedure is repeatedly executed in case that no temperature is established as shown in the flow chart of FIG. 3B, while in case that a temperature is established, the present temperature observed and memorized at the controller 2 is compared with the established temperature. At this moment, in case that the present temperature is lower than the established temperature the controller 2 outputs a high potential signal through the power control output terminal $PP_1$ to operate the heater driving circuit 9, while in case that the present temperature is higher than the established temperature the controller 2 outputs a low potential signal through the power control output terminal PP₁ to stop the operation of the power control output terminal PP₁. Thereafter, if "error" is indicated on the indicator 10 the above procedure is repeatedly executed. If "error" is not indicated on the indicator 10 the above procedure is repeatedly executed after indicating the present temperature on the indicator 10 by outputting the present temperature indicating signal through the function indicating output terminal PP₂.

As described above in detail, the present invention has the effects that since the operation of the heater is controlled so that the present temperature within the oven is reached to the established temperature it is possible to precisely control the temperature within the oven, and if the hardware is in an abnormal condition, that condition is automatically detected to stop the operation of the heater and an error signal is indicated on the indicator. The reliability and safety of the electric range can thereby be remarkably increased.

What is claimed is:

1. A driving control apparatus for an electric range having an oven including a heating device and a self diagnosis function, comprising:

a constant voltage circuit producing a constant voltage as an output;

a sensor power supply coupled to said constant voltage circuit, receiving said constant voltage and producing a sensor power signal as an output;

a temperature detector coupled to said sensor power supply, receiving said sensor power signal and producing a temperature signal as an output in accordance with a temperature in the oven;

an over temperature detector, receiving said sensor power signal and said temperature signal, said over temperature detector comprising, reference signal generator receiving said sensor power signal and producing a reference signal; and a comparator receiving said reference signal and said temperature signal, said comparator producing an over temperature output signal having a value dependent upon an outcome of the comparison;

a comparison circuit receiving said temperature signal and said constant voltage wherein said comparison circuit comprises, a second reference signal generator receiving said constant voltage and producing a second reference signal; and a second comparator receiving said second reference signal and said temperature signal and producing a comparison output signal having a value dependent on the result of comparing said second reference signal and said temperature signal;

a function selection key circuit producing a function selection signal corresponding to a desired range function;

a controller, producing a digital step pulse signal;

a digital analog converter receiving said digital step pulse and producing a corresponding analog signal;

a second comparison circuit receiving said comparison output signal said corresponding analog signal and producing a second comparison output signal and said corresponding analog signal and producing a second comparison output signal corresponding to a result of the comparison done by said second comparison circuit;

said controller receives said second comparison output signal and said function selection signal and produces a power control signal and a function indication signal, said power control signal having a value dependent on said second comparison output signal, said function indication signal having a value dependent on said function selection signal;

a heater driving circuit producing a heater driving signal to control the heating device in response to said power control signal; and an indicator indicating a selected range function in response to said function indication signal.

2. The driving control apparatus of claim 1 wherein said controller includes means for producing a stop signal as said heater driving signal in response to said controller receiving an oven temperature output signal having a predetermined value.

3. The driving control apparatus of claim 2 wherein said controller comprises, means for producing said digital step pulse signal as a sequence of digital pulses of various magnitudes said sequence being in a first predetermined order for initial detection of a temperature in the oven; and means for verifying said initial detection of a temperature, wherein said means for verifying includes means for producing said sequence of digital pulses of various magnitude in a sequence according to a second predetermined order.

4. The driving control apparatus of claim 1 wherein said controller comprises, means for producing said digital step pulse signal as a sequence of digital pulses of various magnitudes said sequence being in a first predetermined order for initial detection of a temperature in the oven; and means for verifying said initial detection of a temperature wherein said means for verifying includes means for producing said sequence of digital pulses of various magnitude in a sequence according to a second predetermined order.

5. The driving control apparatus of claim 4 wherein said means for verifying further includes, a memory storing a first value corresponding to a digital step pulse indicative of a initially detected temperature as indicated by said second comparison circuit; and a verifying comparator comparing said first value to a second value produced when said means for verifying detects said temperature using said sequence of digital step pulse signals of said second order, wherein said verifying comparator produces a first output when said first and second values concur and a second output when said first and second values do not concur.

6. The driving control apparatus of claim 3 wherein said means for verifying further includes, a memory storing a first value corresponding to a digital step pulse indicative of a initially detected temperature as indicated by said second comparison circuit; and a verifying comparator comparing said first value to a second value produced when said means for verifying detects said temperature using said sequence of digital step pulse signals of said second order, wherein said verifying comparator produces a first output when said first and second values concur and a second output when said first and second values do not concur.

7. A method for controlling a heating element of an oven in an electric range comprising the steps of:
producing a first constant voltage;
receiving said first constant voltage and producing a sensor power signal therefrom;
modifying said sensor power signal in accordance with a temperature detected in the oven to produce a temperature signal;
using said sensor power signal to produce a first reference signal;
comparing said first reference signal to said temperature signal and producing an output indicative of whether the temperature exceeds some predetermined temperature;
comparing said temperature signal and said first constant voltage signal to produce a first comparison output;
producing a function selection signal corresponding to a desired range function;
producing a digital step pulse signal as a plurality of pulses of various magnitudes;
converting said digital step pulse signal to an analog signal;
comparing said first comparison output signal and said analog signal and producing a detected temperature output when said analog signal and said first comparison output signal concur;
storing a value indicative of the digital step pulse signal corresponding to said analog signal in concurrence with said first comparison output signal, said value further indicating the value of the detected temperature;
selecting a desired range function;
producing a heating control signal in response to said desired range function, said stored value and said output indicative of whether said temperature exceeds said predetermined temperature.

8. The method of claim 7 further comprising the step of verifying an initially detected temperature by re-detecting the temperature in the oven, said step of verifying includes producing said digital step pulse signals in a second predetermined order, different from said first order, and determining whether a value indicative of the digital step pulse signal corresponding to the analog signal in concurrence with said first comparison output signal during the verification process corresponds to said stored value.

9. The method of claim 8 wherein said digital step pulse signals of said first order comprises a series of incrementally increasing pulses from 0 toward a preset value.

10. The method of claim 9 wherein said digital step pulse signal of said second order comprises a series of incrementally decreasing pulses from said preset value toward zero.

11. The method of claim 9 wherein said digital step pulse signal of said second order comprises a series of pulses alternately selected from two subsequences wherein in said first subsequence the pulses increase incrementally from 0 toward said preset value and in said second subsequence the pulses decrease incrementally from said preset value toward 0.

* * * * *